United States Patent
Itamoto et al.

(10) Patent No.: US 9,346,486 B2
(45) Date of Patent: May 24, 2016

(54) ELECTRIC POWER STEERING SYSTEM

(71) Applicant: JTEKT CORPORATION, Osaka-shi, Osaka (JP)

(72) Inventors: Hidenori Itamoto, Tajimi (JP); Gempei Nakasone, Nisshin (JP); Takashi Mitsuhara, Uda (JP); Makoto Ikeno, Shiki-gun (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/136,385

(22) Filed: Dec. 20, 2013

(65) Prior Publication Data

US 2014/0180544 A1  Jun. 26, 2014

(30) Foreign Application Priority Data

Dec. 25, 2012  (JP) ................. 2012-281519

(51) Int. Cl.
| | |
|---|---|
| B62D 6/00 | (2006.01) |
| B62D 11/00 | (2006.01) |
| B62D 12/00 | (2006.01) |
| B63G 8/20 | (2006.01) |
| B63H 25/04 | (2006.01) |
| G05D 1/00 | (2006.01) |
| G06F 7/00 | (2006.01) |
| G06F 17/00 | (2006.01) |
| G06F 19/00 | (2011.01) |
| B62D 5/04 | (2006.01) |
| B62D 5/02 | (2006.01) |
| B62D 5/00 | (2006.01) |
| H02P 7/00 | (2006.01) |

(52) U.S. Cl.
CPC ............. *B62D 5/0463* (2013.01); *B62D 5/049* (2013.01); *B62D 5/0484* (2013.01); *B62D 6/00* (2013.01)

(58) Field of Classification Search
CPC .............................. B62D 6/00; B62D 5/0463
USPC ................ 701/41, 43; 180/443, 404; 318/432
See application file for complete search history.

(56) References Cited

U.S. PATENT DOCUMENTS

| | | | | |
|---|---|---|---|---|
| 5,082,076 | A | * | 1/1992 | Oshita et al. ................... 180/404 |
| 2001/0052756 | A1 | * | 12/2001 | Noro et al. ..................... 318/432 |
| 2003/0120407 | A1 | * | 6/2003 | Itoh et al. .......................... 701/43 |
| 2008/0035411 | A1 | * | 2/2008 | Yamashita et al. ............. 180/443 |
| 2011/0015828 | A1 | * | 1/2011 | Shimizu ............... B62D 5/0481 701/43 |
| 2012/0185132 | A1 | * | 7/2012 | Kezobo et al. ................... 701/41 |

FOREIGN PATENT DOCUMENTS

| | | |
|---|---|---|
| EP | 2 262 674 B1 | 6/2013 |
| JP | 2003170845 A * | 6/2003 |
| JP | A-2006-248354 | 9/2006 |

OTHER PUBLICATIONS

English Translation for JP2003-170845.*
Dec. 22, 2015 Search Report issued in European Patent Application No. 13198815.6.

* cited by examiner

*Primary Examiner* — Mahmoud Ismail
(74) *Attorney, Agent, or Firm* — Oliff PLC (57) ABSTRACT

When a steering speed reaches a steering speed determination threshold, a steering speed gain is set to "0". As a result, a final basic assist controlled variable becomes "0", and application of an assist force to a steering system is stopped. Therefore, repetition of so-called reverse assist that is a cause of occurrence of an unintended steering behavior, such as self-excited vibration, is stopped. Accordingly, the steering behavior is improved.

8 Claims, 7 Drawing Sheets

ELECTRIC POWER STEERING SYSTEM

INCORPORATION BY REFERENCE/RELATED APPLICATION

This application claims priority to Japanese Patent Application No. 2012-281519 filed on Dec. 25, 2012 the disclosure of which, including the specification, drawings and abstract, is incorporated herein by reference in its entirety.

BACKGROUND OF THE INVENTION

1. Field of the Invention

The invention relates to an electric power steering system.

2. Discussion of Background

Generally, electric power steering systems (EPSs) include a motor as a drive source, a torque sensor, and a control device. The torque sensor generates a sensor signal on the basis of twisting of a torsion bar provided in the intermediate portion of a steering shaft. The control device detects a steering torque on the basis of the sensor signal and controls the torque of the motor so that a suitable assist force is applied to a steering system according to the steering torque. Therefore, in the EPS, in order to obtain the suitable assist force, it is necessary to stably detect the steering torque with high accuracy.

For example, an EPS including a torque sensor that outputs two sensor signals is disclosed in Japanese Patent Application Publication No. 2006-248354 (JP 2006-248354 A). In the EPS, when abnormality has occurred in one sensor signal out of the two sensor signals, the assist force can continue to be applied to the steering system by using the remaining normal sensor signal.

In the EPS in JP 2006-248354 A, in a case where there is a possibility that abnormality has occurred also in the remaining normal sensor signal, if a state where the remaining sensor signal is suspected to be abnormal continues for a predetermined period of time, it is determined that the remaining sensor signal is abnormal to stop the application of the assist force to the steering system. However, since the EPS in JP 2006-248354 A detects the abnormality of the torque sensor on the basis of the amount of fluctuation of the sensor signal, the abnormality of the torque sensor caused by other factors may not be detected.

For example, when the abnormality of the remaining sensor signal is a reverse gain failure in which the plus or minus of the detected value of the steering torque becomes reverse to the original sign, the abnormality cannot be detected and an assist force in a direction opposite to a steering direction is generated in the EPS in JP 2006-248354 A. In the EPS in JP 2006-248354 A, self-excited vibration may occur due to the so-called reverse assist. That is, when steering to the right is performed, assist in a direction toward the left side opposite to the original assist direction is provided. If the steering is turned to the left by being pulled with the assist, assist toward the right side is provided. Thus, vibration may be caused in the steering by the assist in the original assist direction and the assist in the direction opposite to the original assist direction being repeatedly provided due to the driver's steering operation. This may occur even in an EPS including a torque sensor that outputs one sensor signal.

SUMMARY OF THE INVENTION

The invention provides an electric power steering system in which occurrence of an unintended steering behavior can be suppressed.

According to a feature of an example of the invention, there is provided an electric power steering system including: a steering effort assist device that includes a motor as a drive source and applies an assist force to a steering system of a vehicle; a torque sensor that generates a sensor signal according to a steering torque that acts on a steering shaft; a control device that calculates an assist controlled variable that is a control component according to the assist force to be applied to the steering system, based on the steering torque obtained from the sensor signal, and controls the motor according to the assist controlled variable, wherein the control device makes the assist controlled variable zero when an absolute value of a steering speed is equal to or higher than a threshold set based on a possibility that an unintended steering behavior occurs.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Hereinafter, embodiments of the invention will be described with reference to the accompanying drawings.

Figure 1:
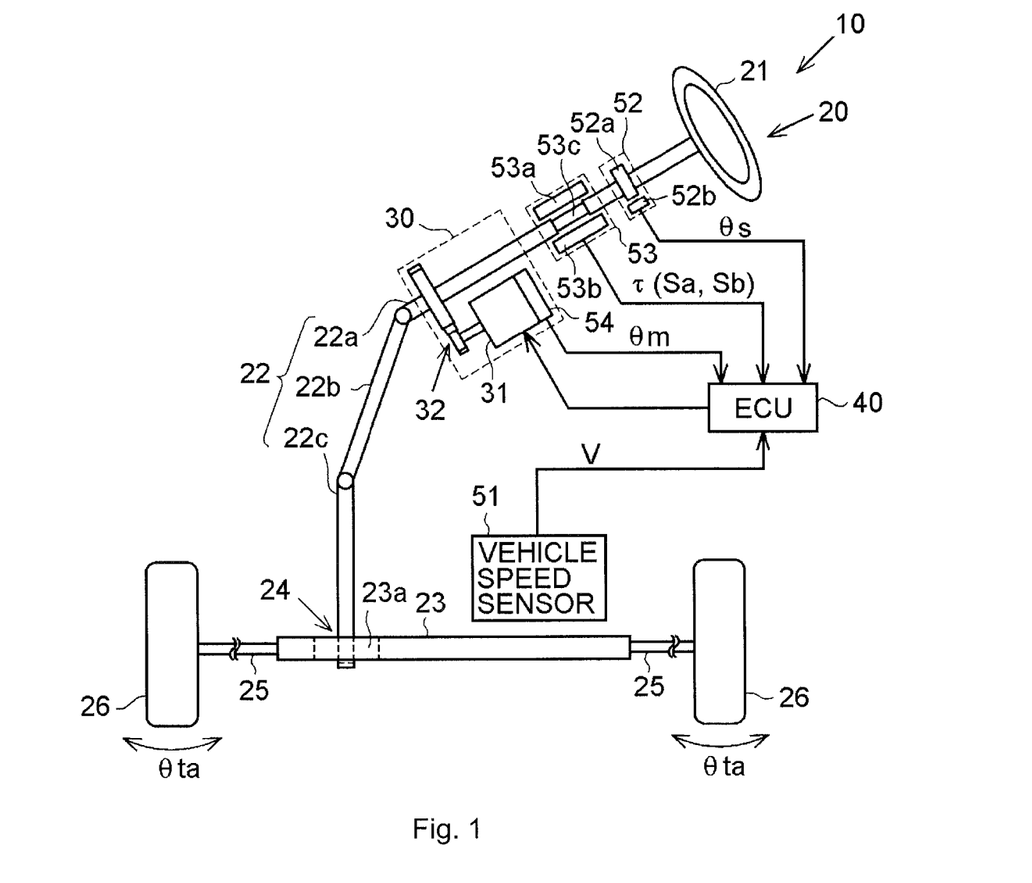
FIG. 1 is a schematic configuration diagram showing an electric power steering system (EPS) according to a first embodiment.

An electric power steering system according to a first embodiment will be described below with reference to FIGS. 1 to 7. As shown in FIG. 1, an electric power steering system (EPS) 10 includes a steering mechanism 20 that causes steered wheels to be steered on the basis of a steering operation performed by a driver, a steering assist mechanism 30 that assists the steering operation performed by the driver, and an electronic control unit (ECU) 40 that controls the operation of the steering assist mechanism 30.

The steering mechanism 20 includes a steering wheel 21 operated by the driver, and a steering shaft 22. The steering shaft 22 includes a column shaft 22a, an intermediate shaft 22b, and a pinion shaft 22c. A lower end portion of the pinion shaft 22c meshes with a rack shaft 23 (rack teeth 23a) that extends in a direction intersecting the pinion shaft 22c. A rotational motion of the steering shaft 22 is converted to a reciprocating linear motion of the rack shaft 23 by a rack and pinion mechanism 24 including the pinion shaft 22c and the rack shaft 23. As the reciprocating linear motion is transmitted to right and left steered wheels 26, 26 via tie rods 25 that are respectively coupled to both ends of the rack shaft 23, steered angles θta of the steered wheels 26, 26 are changed. As the steered angles θta of the steered wheels 26, 26 are changed, the traveling direction of a vehicle is changed.

The steering assist mechanism 30 includes a motor 31 that is a generation source for generating a steering assist force. As the motor 31, a three-phase alternating current motor, such as a brushless motor, is employed. The motor 31 is coupled to the column shaft 22a via a speed-reducing mechanism 32. The speed-reducing mechanism 32 reduces the rotation speed of the motor 31 and transmits the force of the rotation, whose speed has been reduced, to the column shaft 22a. That is, as the torque of the motor is applied to the steering shaft 22 as the steering assist force, the driver is assisted in the steering operation.

The ECU 40 acquires detection results of various sensors provided at the vehicle as information showing a driver's demand or a traveling state, and controls the motor 31 according to the various kinds of acquired information. As the various sensors, there are, for example, a vehicle speed sensor 51, a steering sensor 52, a torque sensor 53, and a rotation angle sensor 54. The vehicle speed sensor 51 detects a vehicle speed V.

The steering sensor 52, which is a magnetic rotation angle sensor, is provided at the column shaft 22a. The steering sensor 52 includes a rotor 52a fixed to the column shaft 22a, and a sensor element 52b, such as a Hall IC, which is provided in proximity to the rotor 52a. The sensor element 52b detects a change in magnetic flux due to the rotation of the rotor 52a. The ECU 40 detects a steering angle θs on the basis of a sensor signal generated by the sensor element 52b.

The torque sensor 53 is provided at the column shaft 22a. The torque sensor 53 includes a sensor core that is not shown, and two sensor elements 53a, 53b, such as Hall ICs. The sensor core generates a magnetic flux that changes on the basis of twisting of a torsion bar 53c provided at an intermediate portion of the column shaft 22a. The two sensor elements 53a, 53b are arranged around the sensor core. If a torque is applied to the steering shaft 22 and the torsion bar 53c is twisted, the magnetic flux, which is applied to the two sensor elements 53a, 53b, respectively, changes. The two sensor elements 53a, 53b generate sensor signals Sa, Sb, respectively, according to changes in the magnetic flux.

The ECU 40 detects a steering torque τ on the basis of the sensor signals Sa, Sb that are generated by the two sensor elements 53a, 53b. The rotation angle sensor 54 is provided at the motor 31 to detect a rotation angle θm of the motor 31. The ECU 40 calculates a target assist force on the basis of the vehicle speed V, the steering angle θs, the steering torque τ, and the rotation angle θm. The ECU 40 supplies driving electric power to the motor 31 in order to cause the steering assist mechanism 30 to generate the target assist force.

Figure 2:
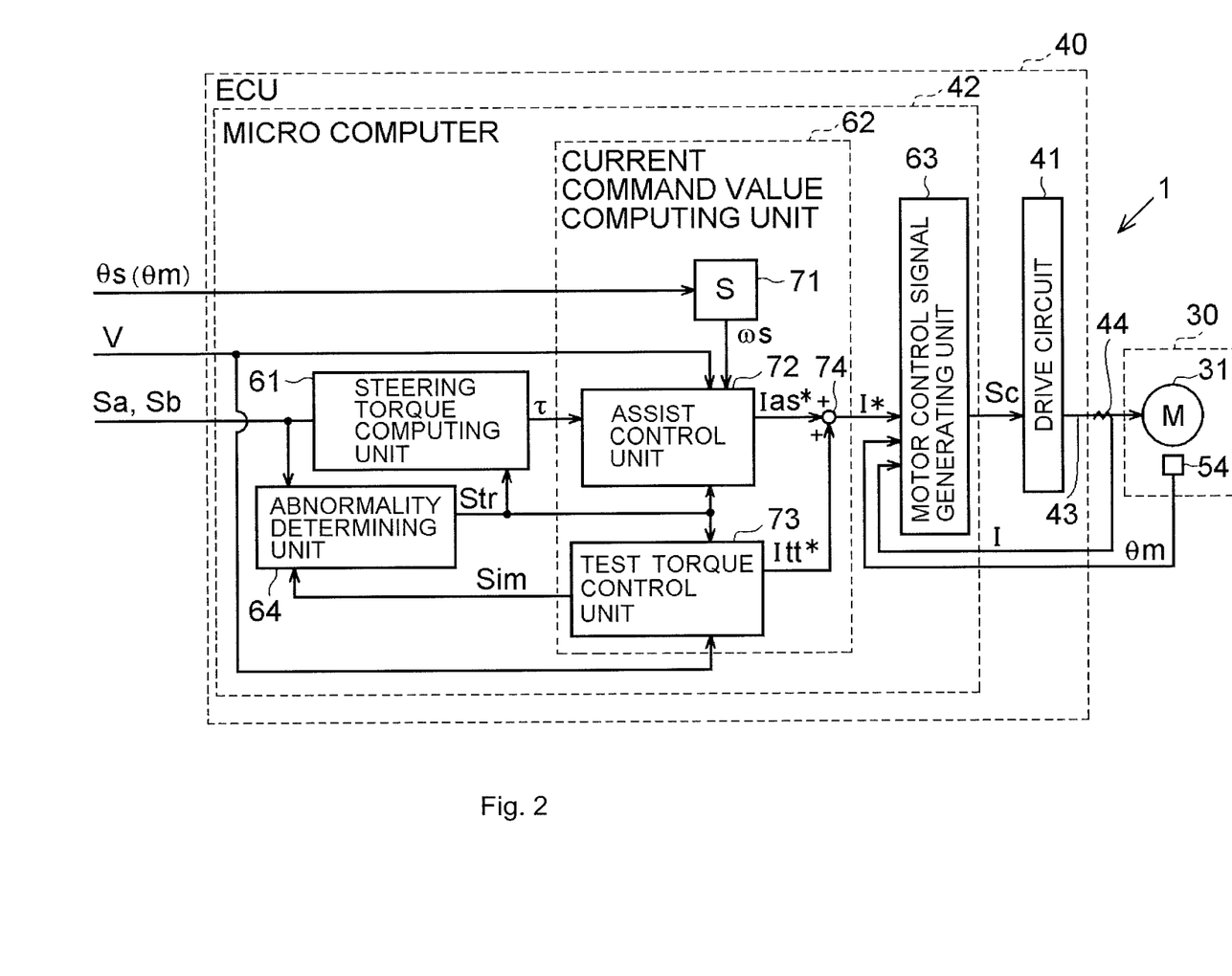
FIG. 2 is a control block diagram showing the EPS.

Next, the hardware configuration of the ECU will be described. As shown in FIG. 2, the ECU 40 includes a drive circuit (inverter circuit) 41 and a microcomputer 42. The drive circuit 41 converts a direct current supplied from a direct-current power source, such as a battery, to a three-phase alternating current, on the basis of a motor control signal Sc (to be described below) generated by the microcomputer 42. The three-phase alternating current obtained by conversion is supplied to the motor 31 via power supply paths 43 for respective phases. The power supply paths 43 for respective phases are provided with current sensors 44. The current sensors 44 detect actual current values I generated in the power supply paths 43 for respective phases. FIG. 2 shows one of the power supply paths 43 for respective phases and one of the current sensors 44 for respective phases for convenience of description.

The microcomputer 42 acquires the detection results of the vehicle speed sensor 51, the steering sensor 52, the torque sensor 53, the rotation angle sensor 54, and the current sensors 44 in predetermined sampling cycles. The microcomputer 42 generates a motor control signal (Pulse width modulation (PWM) driving signal) Sc on the basis of the acquired detection results, that is, the vehicle speed V, the steering angle θs, the steering torque τ (precisely, the two sensor signals Sa, Sb), the rotation angle θm, and the actual current values I.

Precisely, the microcomputer 42 executes vector control for a motor current through PWM driving of the drive circuit 41. The vector control is executed to separate the motor current into a d-axis component (magnetic field current component) parallel to a magnetic field and a q-axis component (torque current component) orthogonal to the d-axis component, and to independently control these separated currents to target values, respectively. Since the vector control is executed, the motor 31 can be handled in a manner similar to a manner in which a direct-current motor is handled.

Next, the functional configuration of the microcomputer will be described. The microcomputer 42 includes various arithmetic processing units implemented by executing a control program stored in a storage unit that is not shown. As shown in FIG. 2, the microcomputer 42 includes a steering torque computing unit 61, a current command value computing unit 62, a motor control signal generating unit 63, and an abnormality determining unit 64 as the arithmetic processing units.

The steering torque computing unit 61 calculates the steering torque τ on the basis of the two sensor signals Sa, Sb that are generated in the torque sensor 53. As described above, in the torque sensor 53, the magnetic detecting elements are used as the sensor elements. Therefore, the steering torque computing unit 61 performs a correction process relating to the temperature characteristics or the like of the torque sensor 53, using the sensor signals Sa, Sb of two systems, in order to detect the steering torque τ with high accuracy.

The current command value computing unit 62 calculates a current command value I* corresponding to the target assist force to be generated by the steering assist mechanism 30, on the basis of the steering angle θs, the vehicle speed V, and the steering torque τ. The current command value I* is a command value showing a current to be supplied to the motor 31. Precisely, the current command value I* includes a q-axis current command value and a d-axis current command value in a d-q coordinate system. The d-q coordinate system is a rotation coordinate system according to the rotation angle θm of the motor 31.

The motor control signal generating unit 63 acquires the current command value I*, an actual current value I, and the rotation angle θm of the motor 31, and executes feedback control of currents so that the actual current value I follows the current command value I* on the basis of the acquired information. The motor control signal generating unit 63 determines the deviation between the current command value I* and the actual current value I, and generates the motor control signal Sc so that the deviation is eliminated.

Precisely, the motor control signal generating unit 63 converts three-phase current values of the motor 31 to two-phase vector components, that is, a d-axis current value and a q-axis current value in the d-q coordinate system, using the rotation angle θm. Then, the motor control signal generating unit 63 determines the deviation between the d-axis current value and the d-axis current command value and the deviation between the q-axis current value and the q-axis current command value, and calculates a PWM duty that eliminates these deviations. The PWM duty is included in the motor control signal Sc. As a current according to the motor control signal Sc is supplied to the motor 31 through the drive circuit 41, the motor 31 generates a rotation force according to the target assist force (assist command value).

The microcomputer 42 has an abnormality detection function of detecting the abnormality of the torque sensor 53. The microcomputer 42 includes the abnormality determining unit 64 as means for realizing the function. The abnormality determining unit 64 detects the presence or absence of abnormality of the two sensor signals Sa, Sb generated by the torque sensor 53, and the presence or absence of abnormality of the torque sensor 53. The abnormality determining unit 64 detects the presence or absence of abnormality of the two sensor signals Sa and of Sb, for example through the following determination processes (A) and (B).

(A) Determination process for determining whether or not each of the values of the two sensor signals Sa, Sb deviates from a corresponding value obtained at a normal time. If each of the values of the two sensor signals Sa, Sb deviates from the corresponding value obtained at a normal time, each of the deviating sensor signals Sa, Sb, is abnormal.

(B) Comparison and determination process for the values of the two sensor signals Sa, Sb, or comparison and determination process for the amounts of change in the two sensor signals Sa, Sb per unit time. If the values of the two sensor signals Sa, Sb are normal, the values of the two sensor signals Sa, Sb or the amounts of change in the two sensor signals Sa, Sb per unit time coincide with each other. If at least one of the two sensor signals Sa, Sb is abnormal, the values of the two sensor signals Sa, Sb or the amounts of change in the two sensor signals Sa, Sb per unit time do not coincide with each other.

The abnormality determining unit 64 generates an abnormality detection signal Str when results of determination for determining the presence or absence of abnormality regarding the two sensor signals Sa, Sb show abnormality. The microcomputer 42 executes power assist control according to a mode regarding occurrence of abnormality in the torque sensor 53 detected by the abnormality determining unit 64. The power assist control includes three kinds of control, that is, normal power assist control (normal control), assist stop control, and assist continuation control. The microcomputer 42 executes the normal control when the torque sensor 53 is normal, that is, when both of the two sensor elements 53a, 53b are normal.

The microcomputer 42 executes the assist stop control when both of the two sensor elements 53a, 53b are abnormal. That is, the current command value computing unit 62 stops output of the current command value I* when it is determined that both of the two sensor elements 53a, 53b have failed on the basis of the abnormality detection signal Str.

The microcomputer 42 executes the assist continuation control as backup control when only either one of the two sensor elements 53a, 53b is abnormal. That is, the steering torque computing unit 61 continues calculation of the steering torque τ by using a normal sensor signal generated by the other sensor element in which failure does not occur. The current command value computing unit 62 calculates the current command value I* on the basis of the steering torque τ calculated using the remaining normal sensor signal. The power assist control is continued and executed on the basis of the current command value I*. In this case, the correction process using the two sensor signals Sa, Sb is not executed.

Here, when the assist continuation control is executed, that is, when one of the two sensor elements 53a, 53b fails, the above-described abnormality determination based on comparison with the other sensor signal cannot be performed for the remaining one normal sensor signal.

Thus, the microcomputer 42 performs the abnormality determination for the remaining normal sensor signal as follows. That is, the microcomputer 42 periodically applies an instantaneous motor torque to a steering system through control of the motor 31, when executing the assist continuation control. Although the instantaneous motor torque is not related to application of the assist force that is an inherent function of the EPS, the torsion bar 53c is twisted according to the instantaneous motor torque. Therefore, a situation is caused in which the changing timing and changing direction of the remaining sensor signal can be naturally predicted. The microcomputer 42 executes abnormality detection processing for the remaining sensor signal, on the basis of whether the application of the instantaneous motor torque is reflected in the remaining sensor signal that is used as a basis for the assist continuation control. The current command value computing unit 62 calculates the current command value I* in order to generate the instantaneous motor torque.

Next, the current command value computing unit 62 will be described in detail. As shown in FIG. 2, the current command value computing unit 62 includes a differentiator 71, an assist control unit 72, a test torque control unit 73, and an adder 74. The differentiator 71 performs a differential process on the steering angle θs to calculate a steering speed ωs. The steering speed ωs may be determined by performing the differential process on the rotation angle θm of the motor 31.

The assist control unit 72 calculates a basic assist controlled variable Ias* on the basis of the steering speed ωs, the vehicle speed V, and the steering torque τ. The basic assist controlled variable Ias* is a basic component for generating the target assist force with a suitable magnitude according to the steering speed ωs, the vehicle speed V, and the steering torque τ. The test torque control unit 73 generates a test torque controlled variable Itt* as a control component for applying the instantaneous motor torque.

Figure 3:
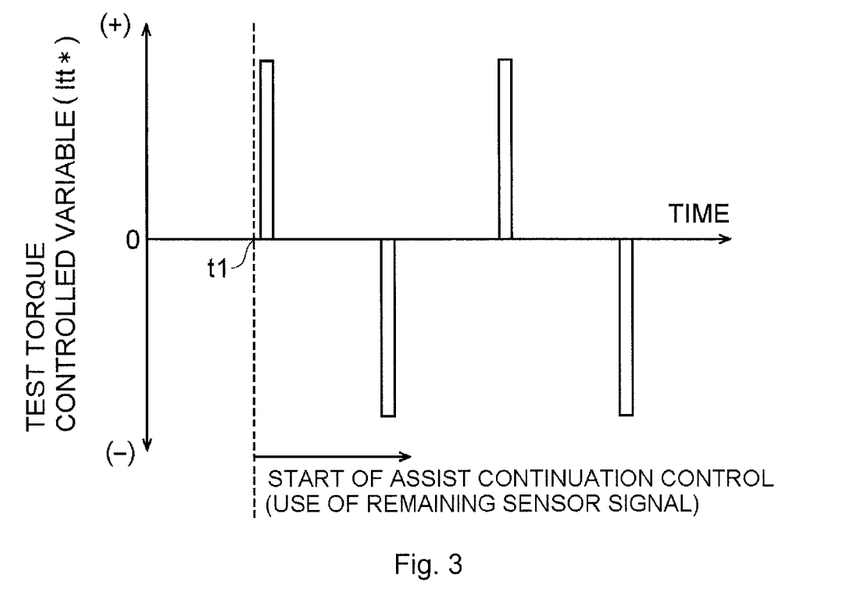
FIG. 3 is a waveform diagram showing a state in which an instantaneous motor torque is applied when assist continuation control is executed.

As shown in FIG. 3, when execution of the assist continuation control is started (time t1), the test torque control unit 73 generates the test torque controlled variable Itt* periodically while alternately reversing the sign (+ or −) thereof after the start of the execution. That is, the instantaneous motor torque is periodically applied to the steering system while the application direction thereof is alternately changed. The output time period for the test torque controlled variable Itt* per one time is set such that the steering wheel 21 hardly moves due to the inertia when the motor torque is applied.

The test torque control unit 73 generates an instruction signal Sim. The instruction signal Sim is a signal that instructs the abnormality determining unit 64 to execute the abnormality detection processing for the remaining sensor signal during the assist continuation control.

The adder 74 adds up the basic assist controlled variable Ias* generated by the assist control unit 72 and the test torque controlled variable Itt* generated by the test torque control unit 73, thereby generating the current command value I*. The abnormality determining unit 64 executes the abnormality detection processing for the remaining sensor signal during the assist continuation control, on the basis of the presence or absence of the instruction signal Sim. When the abnormality of the remaining sensor signal is detected, it is determined that abnormality has occurred in both of the two sensor signals Sa, Sb, and therefore, the assist stop control is executed.

As described above, when the assist continuation control is executed, the presence or absence of abnormality of the remaining sensor signal is detected (secondary failure detection is performed) by applying the instantaneous motor torque.

However, when the vehicle is in a stopped state (vehicle speed V=0 km/h) or when the vehicle is traveling at an extremely low speed (vehicle speed V≤2 km/h), the steering torque caused by the driver is apt to become large. Therefore, the steering torque τ may exceed a detection range (for example, ±10 Nm) of the torque sensor 53 (precisely, the sensor elements 53a, 53b) depending on the situation in which steering is performed. In this case, occurrence of abnormality in the remaining normal sensor signal may be erroneously detected by the abnormality determining unit 64 for the following reason. That is, if the steering torque τ is brought to a saturation state in which the steering torque τ reaches the limit of the detection range of the torque sensor 53, the value of the remaining normal sensor signal is always a maximum value, that is, the value of the remaining normal sensor signal becomes constant. Even if the instantaneous motor torque is applied in this saturation state, the value of the remaining sensor signal does not change. Therefore, the abnormality determining unit 64 determines that the remaining sensor signal is abnormal although the remaining sensor signal is normal. As a result, the microcomputer 42 determines that abnormality has occurred in both of the two sensor elements 53a, 53b, and executes the above-described assist stop control.

If the abnormality detection processing for the remaining sensor is executed in this manner even when the vehicle is in the stopped state or the like, it may be erroneously detected that the remaining sensor signal is abnormal, and thus, the application of the assist force to the steering system may be stopped. However, since application of the assist force is required particularly when the vehicle is in the stopped state or when the vehicle is traveling at an extremely low speed, it is desired to avoid the stop of the application of the assist force, if possible.

Thus, in the present embodiment, the abnormality detection processing for the remaining sensor signal is stopped when the vehicle is in the stopped state or when the vehicle is traveling at an extremely low speed. This makes it possible to avoid the stop of the application of the assist force to the steering system even in a case where the torque sensor 53 is brought to a saturation state when the vehicle is in the stopped state or when the vehicle is traveling at an extremely low speed. In this case, the abnormality of the remaining sensor signal cannot be detected. However, even if a secondary failure cannot be detected, there is little adverse effect when the vehicle is in the stopped state or when the vehicle is traveling at an extremely low speed.

However, in a case where the abnormality detection processing for the remaining sensor signal is stopped when the vehicle is in the stopped state or when the vehicle is traveling at an extremely low speed, assist cannot be stopped when abnormality has actually occurred in the remaining sensor signal. As a result, an unintended assist force may be applied to the steering system. For example, when the secondary failure of the torque sensor is a so-called reverse gain failure as described above, the plus or minus of a detected torque value is reversed, and therefore, self-excited vibration may occur.

Figure 4:
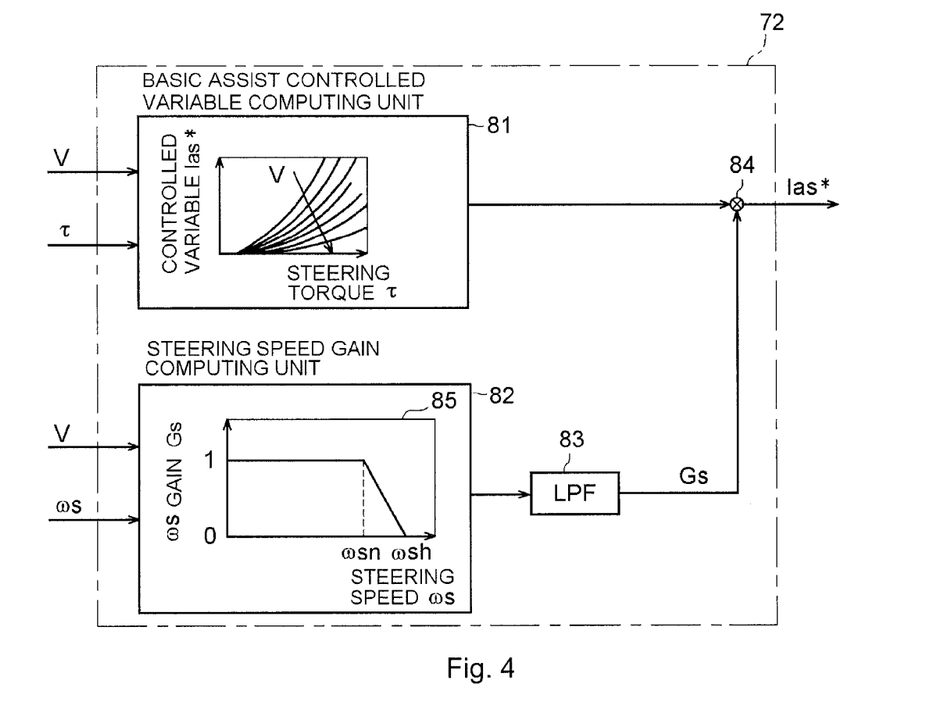
FIG. 4 is a control block diagram showing the configuration of an assist control unit.

Thus, in the present embodiment, it is determined whether there is a situation where an unintended steering behavior, such as self-excited vibration, is apt to occur, on the basis of the steering speed ωs, and when there is the situation where the unintended steering behavior is apt to occur, the basic assist controlled variable Ias* is made smaller than that at a normal time. In order to realize the function, the assist control unit 72 is configured as follows. As shown in FIG. 4, the assist control unit 72 includes a basic assist controlled variable computing unit 81, a steering speed gain computing unit 82, a low pass filter 83, and a multiplier 84.

The basic assist controlled variable computing unit 81 calculates the basic assist controlled variable Ias*, using a vehicle-speed-adaptive three-dimensional map. The basic assist controlled variable Ias* is a basic component for generating an assist force corresponding to the steering torque τ. The basic assist controlled variable computing unit 81 calculates the basic assist controlled variable Ias* having a larger value (absolute value) so that a larger assist force is applied to the steering system, as the steering torque τ (absolute value) is larger and as the vehicle speed V is lower.

The steering speed gain computing unit 82 calculates a steering speed gain Gs on the basis of the vehicle speed V and the steering speed ωs, when the vehicle speed V is equal to or lower than a vehicle speed determination threshold Vh. The vehicle speed determination threshold Vh is set according to a condition for stopping the execution of the abnormality detection processing for the remaining sensor signal. In the present example, the vehicle speed determination threshold Vh is set to 2 km/H.

The steering speed gain Gs is used in order to limit the basic assist controlled variable Ias* according to the steering speed ωs. More specifically, the steering speed gain computing unit 82 includes a steering speed gain map 85 that defines the relationship between the steering speed ωs and the steering speed gain Gs. The steering speed gain computing unit 82 sets the steering speed gain Gs according to the steering speed ωs to a value within a range from "1" to "0", using the steering speed gain map 85.

The steering speed gain map 85 has the following characteristics. That is, in the steering speed gain map 85, the steering speed gain Gs is set to "1" until the steering speed ωs reaches a value ωsn near a steering speed determination threshold ωsh. Also, in the steering speed gain map 85, the value of the steering speed gain Gs is set to gradually decrease after the steering speed ωs reaches the value ωsn near the steering speed determination threshold ωsh (0<Gs≤1). Further, in the steering speed gain map 85, the steering speed gain Gs is set to "0 (zero)" when the steering speed ωs reaches the steering speed determination threshold ωsh.

The steering speed determination threshold ωsh is set on the basis of simulations, experiments, or the like in which a vehicle model is used. That is, a state is created in which a failure (secondary failure) is actually caused in the torque sensor 53, and the steering speed ωs, around which an unintended steering behavior such as the above-described self-excited vibration occurs, is determined. The steering speed determination threshold ωsh is set on the basis of the steering speed ωs at the time when the unintended steering behavior is detected. The steering speed determination threshold ωsh is set also from a viewpoint of securing driver's steering feel. That is, if the steering speed determination threshold ωsh is too large, the assist force is limited after the unintended steering behavior occurs, which is not preferable. In contrast, if the steering speed determination threshold ωsh is too small, the assist force may be limited frequently. The steering speed determination threshold ωsh is set in consideration of such situations. The low pass filter 83 eliminates frequency components, such as noise included in the steering speed gain Gs calculated using the steering speed gain map 85.

The multiplier 84 multiplies the basic assist controlled variable Ias* calculated by the basic assist controlled variable computing unit 81 by the steering speed gain Gs calculated by the steering speed gain computing unit 82 (precisely, the steering speed gain Gs filtered by the low pass filter 83).

The value obtained by multiplying the basic assist controlled variable Ias* by the steering speed gain Gs becomes a final basic assist controlled variable Ias*. For example, when the steering speed gain Gs is "1", the basic assist controlled variable Ias* calculated by the basic assist controlled variable computing unit 81 becomes the final basic assist controlled variable Ias*, as it is. When the steering speed gain Gs is "0", the basic assist controlled variable Ias* is calculated by the basic assist controlled variable computing unit 81, but the final basic assist controlled variable Ias* becomes "0".

Next, the operation of the electric power steering system configured as described above will be described. First, a procedure of the power assist control executed by the microcomputer 42 will be described according to a flowchart of FIG. 5. Processes related to the flowchart are executed in predetermined sampling cycles when a power source of the vehicle is turned on.

Figure 5:
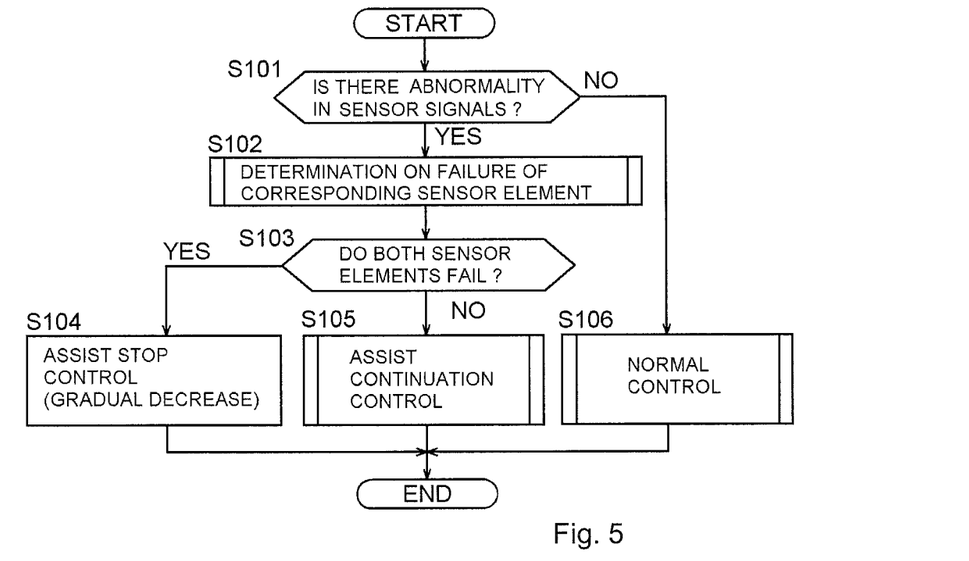
FIG. 5 is a flowchart showing a procedure of assist control executed according to each mode regarding occurrence of abnormality in a torque sensor.

As shown in the flowchart of FIG. 5, the microcomputer 42 determines the presence or absence of abnormality of each of the two sensor signals Sa, Sb through the abnormality determining unit 64 (Step S101).

When abnormality of at least one of the two sensor signals Sa, Sb is detected through the abnormality determining unit 64 (Step S101, YES), the processing of the microcomputer 42 proceeds to Step S102.

In Step S102, the microcomputer 42 performs failure determination on the sensor elements 53*a*, 53*b* that are output elements for the two sensor signals Sa, Sb, on the basis of the abnormality detection result obtained in Step S101 (Step S103).

When it is determined that both of the two sensor elements 53*a*, 53*b* fail (Step S103, YES), the microcomputer 42 executes the assist stop control. That is, the microcomputer 42 gradually reduces the assist force applied to the steering system in order to promptly stop the power assist control to provide fail-safe protection.

In contrast, when it is determined in the above-described Step S103 that only either one of the two sensor elements 53*a*, 53*b* fails (Step S103, NO), the microcomputer 42 executes the assist continuation control (Step S105).

That is, the microcomputer 42 detects the steering torque τ on the basis of the sensor signal (remaining sensor signal) generated by the remaining normal sensor element that is determined as having no failure, and continues the power assist control on the basis of the steering torque τ.

When it is determined in the above-described Step S101 that there is no abnormality in both of the two sensor signals Sa, Sb, that is, both of the two sensor signals Sa, Sb are normal (Step S101, NO), the microcomputer 42 executes the normal power assist control (Step S106).

Next, a procedure of processing executed by the microcomputer 42 when the normal power assist control or the assist continuation control is executed will be described according to a flowchart of FIG. 6. Processes related to the flowchart are executed when processing proceeds to Step S105 or Step S106 in the above-described flowchart of FIG. 5.

Figure 6:
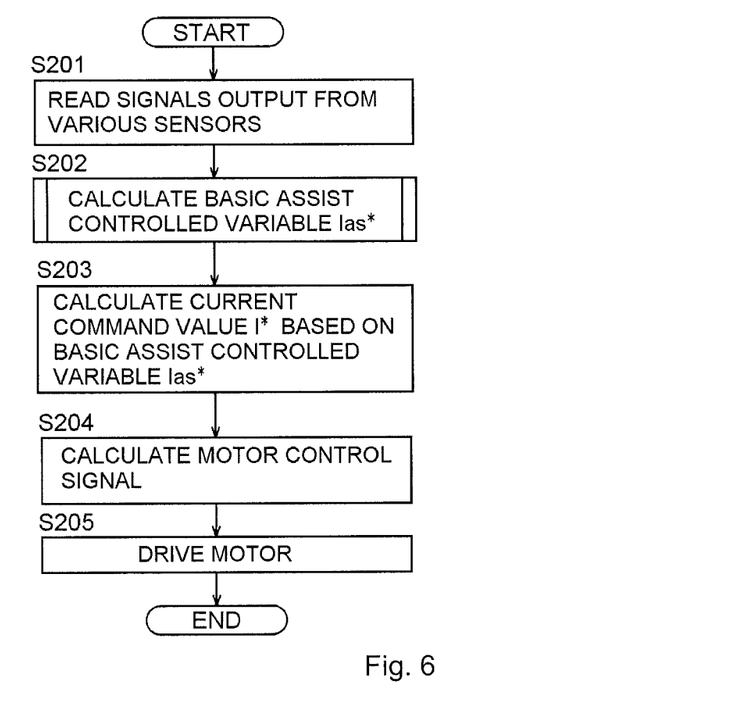
FIG. 6 is a flowchart showing a procedure of the assist control.

As shown in the flowchart of FIG. 6, the microcomputer 42 first reads signals generated by various sensors, such as the vehicle speed sensor 51, the steering sensor 52, and the torque sensor 53, (Step S201). Next, the microcomputer 42 calculates the basic assist controlled variable Ias* on the basis of the signals generated by the various sensors (Step S202). Next, the microcomputer 42 calculates the current command value I* on the basis of the basic assist controlled variable Ias* calculated in Step S202 (Step S203).

Next, the microcomputer 42 calculates the motor control signal through execution of electric current feedback control using the current command value I* and the actual current value I (Step S204). The microcomputer 42 supplies the motor control signal to the drive circuit 41, thereby driving the motor 31 (Step S205).

Figure 7:
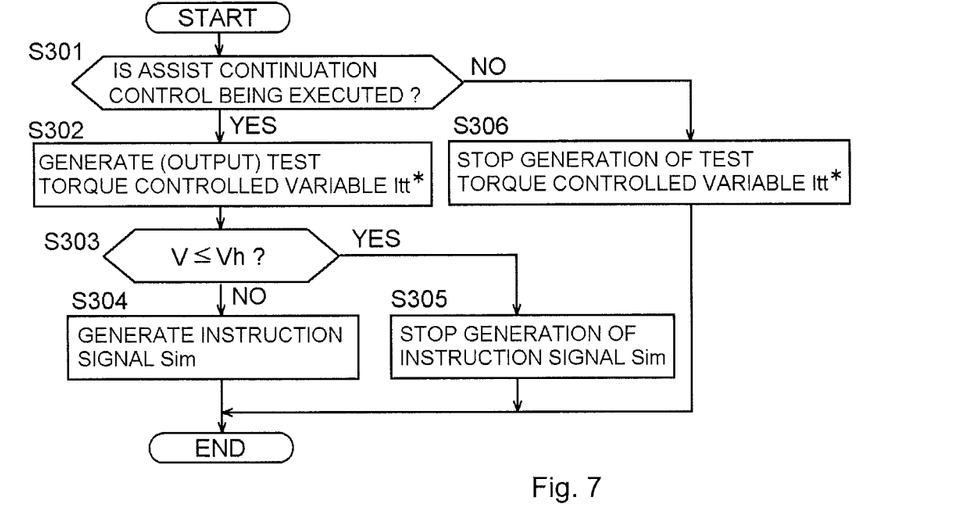
FIG. 7 is a flowchart showing a procedure of processing for generating a test torque controlled variable.

Next, a procedure of processing for generating the test torque controlled variable when the assist continuation control is executed will be described according to a flowchart of FIG. 7. As shown in the flowchart of FIG. 7, when it is determined that the assist continuation control is being executed (Step S301, YES), the microcomputer 42 (precisely, the test torque control unit 73) generates (outputs) the test torque controlled variable Itt* as shown in the above-described FIG. 3 (Step S302). Thus, the instantaneous motor torque according to the test torque controlled variable Itt* is applied to the steering system. Next, the microcomputer 42 determines whether or not the vehicle speed V detected through the vehicle speed sensor 51 is equal to or lower than the vehicle speed determination threshold Vh (Step S303).

When it is determined that vehicle speed V is higher than the vehicle speed determination threshold Vh (Step S303, NO), the microcomputer 42 generates the instruction signal Sim (Step S304) and then ends the processing.

When it is determined in the above-described Step S303 that the vehicle speed V is equal to or lower than the vehicle speed determination threshold Vh (Step S303, YES), the microcomputer 42 stops the generation of the instruction signal Sim (Step S305) and then ends the processing.

When it is determined in the above-described Step S301 that the assist continuation control is not being executed (Step S301, NO), the microcomputer 42 stops the generation of the test torque controlled variable Itt* (Step S306) and then ends the processing.

Figure 8:
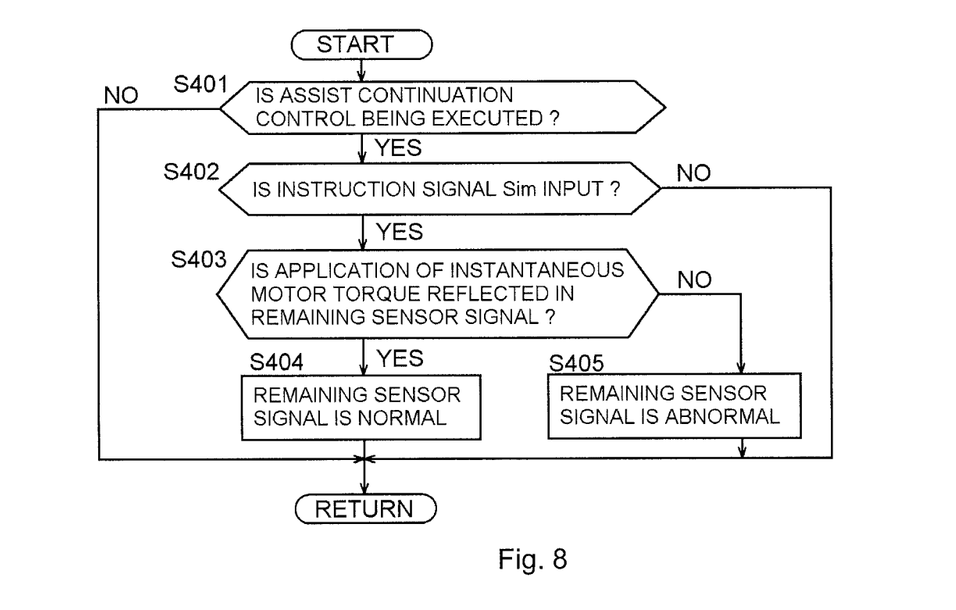
FIG. 8 is a flowchart showing a procedure of abnormality detection processing for a remaining sensor signal.

Next, a procedure of the abnormality detection processing for the remaining sensor signal when the assist continuation control is executed will be described according to a flowchart of FIG. 8. As shown in the flowchart of FIG. 8, when it is determined that the assist continuation control is being executed (Step S401, YES), the microcomputer 42 (precisely, the abnormality determining unit 64) determines the presence or absence of input of the instruction signal Sim (Step S402).

The microcomputer 42 ends the processing when the instruction signal Sim is not input (Step S402, NO). That is, the abnormality determination for the remaining sensor signal is stopped. In contrast, when the instruction signal Sim is input (Step S402, YES), the microcomputer 42 determines whether or not the application of the instantaneous motor torque is reflected in the remaining sensor signal (Step S403). The determination is performed on the basis of whether or not the remaining sensor signal changes at a suitable timing (within a predetermined time) corresponding to the application of the instantaneous motor torque to the steering system and whether or not the direction and magnitude of the change of the remaining sensor signal are suitable values, respectively.

When it is determined that the application of the instantaneous motor torque is reflected in the remaining sensor signal (Step S403, YES), the microcomputer 42 determines that the remaining sensor signal is normal (Step S404), and when it is determined that the application of the instantaneous motor torque is not reflected in the remaining sensor signal (Step S403, NO), the microcomputer 42 determines that the remaining sensor signal is abnormal (Step S405).

The microcomputer 42 returns, to the main routine (precisely, Step S101) shown in FIG. 5, the result of determination as to whether the remaining sensor signal is normal or abnormal in Step S404 or Step S405.

Figure 9:
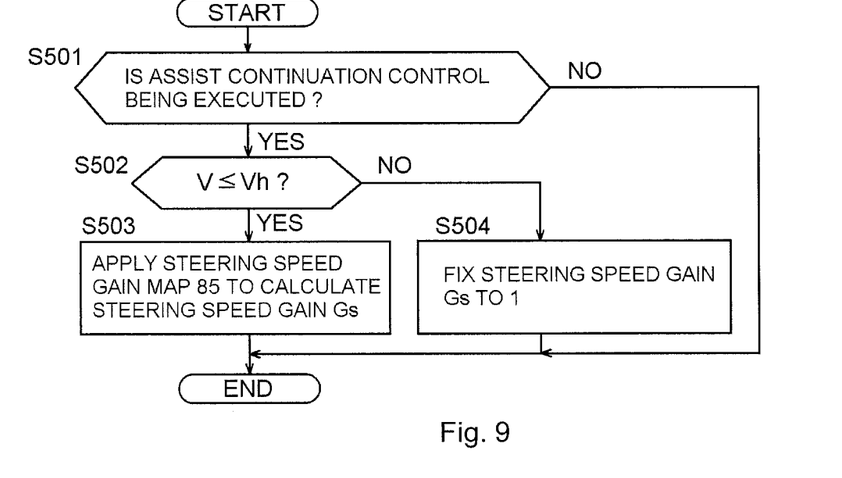
FIG. 9 is a flowchart showing a procedure of processing for calculating a steering speed gain.

Next, a procedure of processing for calculating a steering speed gain when the assist continuation control is executed will be described according to a flowchart of FIG. 9. As shown in the flowchart of FIG. 9, when it is determined that the assist continuation control is being executed (Step S501, YES), the microcomputer 42 (precisely, the steering speed gain computing unit 82) determines whether or not the vehicle speed V detected through the vehicle speed sensor 51 is equal to or lower than the vehicle speed determination threshold Vh (Step S302).

When it is determined that the vehicle speed V is equal to or lower than the vehicle speed determination threshold Vh (Step S502, YES), the microcomputer 42 calculates the steering speed gain Gs by applying the steering speed gain map 85 (Step S503) and ends the processing. The vehicle speed determination process in the Step S502 can also be regarded as the process for determining whether or not the abnormality detection processing for the remaining sensor signal should be executed.

When it is determined that the vehicle speed V is higher than the vehicle speed determination threshold Vh (Step S502, NO), the microcomputer 42 does not apply the steering speed gain map 85, but fixes the steering speed gain Gs to "1" (Step S504) and ends the processing.

Even when it is determined in the above-described Step S501 that the assist continuation control is not being executed (Step S501, NO), the microcomputer 42 ends the processing.

As described above, when the vehicle speed V becomes equal to or lower than the vehicle speed determination threshold Vh in a case where the assist control is executed, the following effects are obtained by applying the steering speed gain map 85.

That is, the steering speed gain Gs is set to "1" until the steering speed $\omega s$ reaches the value $\omega sn$ near the steering speed determination threshold $\omega sh$. This is because, when the steering speed $\omega s$ does not reach the value $\omega sh$ near the steering speed determination threshold $\omega sh$, the possibility that the above-described unintended steering behavior occurs is low. At this time, the basic assist controlled variable Ias* calculated by the basic assist controlled variable computing unit 81 becomes the final basic assist controlled variable Ias*, as it is.

As the steering speed $\omega s$ approaches the steering speed determination threshold $\omega sh$ after having reached the value $\omega sn$ near the steering speed determination threshold $\omega sh$, the possibility that the above-described unintended steering behavior occurs increases. Therefore, as the steering speed $\omega s$ increases, the steering speed gain Gs is set to a smaller value. As the steering speed gain Gs becomes smaller, the basic assist controlled variable Ias* becomes smaller. As the basic assist controlled variable Ias* becomes smaller, the torque of the motor 31 decreases and accordingly the assist force applied to the steering system also decreases.

An example of the unintended steering behavior is the self-excited vibration of the steering, which is caused when the reverse gain failure occurs in the torque sensor 53. The self-excited vibration occurs due to the assist force in a direction opposite to an original assist direction being applied to the steering system. When the self-excited vibration occurs, the steering speed $\omega s$ becomes significantly faster than that at a normal time. Therefore, it is possible to determine whether or not there is a situation where the self-excited vibration is apt to occur, by monitoring the steering speed $\omega s$. Then, by making the assist force applied to the steering system weaker than that at a normal time as the steering speed $\omega s$ increases and approaches the situation where the self-excited vibration is apt to occur as in the present example, it is possible to suppress the generation of the self-excited vibration. This is because the assist force directed in the direction opposite to the original direction becomes weak.

When the steering speed $\omega s$ reaches the steering speed determination threshold $\omega sh$, the final basic assist controlled variable Ias* is made "0" by setting the steering speed gain Gs to "0". That is, the application of the assist force to the steering system is stopped. Since repetition of so-called reverse assist, which is a cause of occurrence of the self-excited vibration, is stopped, the self-excited vibration does not occur. Accordingly, the steering behavior is improved.

According to the present embodiment, the following effects can be obtained. (1) When the steering speed $\omega s$ reaches the steering speed determination threshold $\omega sh$, the steering speed gain Gs is set to "0". As a result, the final basic assist controlled variable Ias* becomes "0", and the application of the assist force to the steering system is stopped. As the application of the assist force is stopped, an increase in the absolute value of the steering speed $\omega s$ is suppressed. Therefore, repetition of the so-called reverse assist that is the cause of occurrence of the self-excited vibration is suppressed, and the self-excited vibration is unlikely to occur. Accordingly, the steering behavior is improved.

(2) When the vehicle is in the stopped state or the vehicle is traveling at an extremely low speed, an unintended steering behavior is particularly apt to occur because the assist force applied to the steering system becomes large. In this case, when the absolute value of the steering speed $\omega s$ becomes equal to or higher than the steering speed determination threshold $\omega sh$, the basic assist controlled variable Ias* is made zero. This reduces the assist force applied to the steering system, and thus, the unintended steering behavior is improved effectively.

When the vehicle is in the stopped state or is traveling at an extremely low speed during the execution of the assist continuation control, the abnormality determining unit 64 does not execute the abnormality detection processing for the remaining sensor signal. This is because there is a possibility that the abnormality detection processing for the remaining sensor signal may not be normally executed when the vehicle is in the stopped state or is traveling at an extremely low speed as mentioned above. Therefore, when the vehicle is in the stopped state or is traveling at an extremely low speed, it is not possible to detect the abnormality of the remaining sensor signal, and accordingly, it is not possible to execute processing in which if the abnormality of the remaining sensor signal is detected, the assist stop control is executed. As the fail-safe protection provided when the vehicle is in the stopped state or is traveling at an extremely low speed, the process of reducing the basic assist controlled variable Ias* based on the steering speed $\omega s$ is executed. That is, at a normal time, the presence or absence of abnormality of the remaining sensor signal can be confirmed through application of the instantaneous motor torque according to the test torque controlled variable Itt*, and therefore, monitoring of the steering speed $\omega s$ is unnecessary. In contrast, when the vehicle is in the stopped state or is traveling at an extremely low speed, the abnormality detection processing through the application of the instantaneous motor torque is not executed, and therefore, it is preferable to execute the process of reducing the basic assist controlled variable Ias* based on the steering speed ωs. Thus, the process of reducing the basic assist controlled variable Ias* based on the steering speed ωs can be executed only when required.

Next, an electric power steering system according to a second embodiment will be described. The second embodiment basically has the same configuration as that of the first embodiment shown in the above-described FIGS. 1, 2, and 4.

The rotation angle θm (electrical angle) of the motor 31 detected by the rotation angle sensor 54 may be different from an actual electrical angle, depending on the state of attachment of the rotation angle sensor 54. In this case, a current, whose value is different from the value of a current that should be caused to flow, is supplied to the motor 31 due to the difference between the detected rotation angle θm and the actual electrical angle. Also, the following situations may occur due to the difference in the electrical angle.

That is, when the steering speed ωs reaches the above-described steering speed determination threshold ωsh in a case where the above-described assist continuation control is executed, the steering speed gain Gs is set to "0". As a result, the basic assist controlled variable Ias* should become "0" and supply of electric power to the motor 31 should be stopped theoretically. However, in actuality, a slight current may be supplied to the motor 31 due to the difference in the electrical angle described above.

In this case, when the vehicle is present on a normal road surface, self-steering does not occur due to the friction between each tire and the road surface even if the assist force is slightly applied to the steering system. However, for example, when the vehicle is present on a road surface with a low friction coefficient such as a frozen road surface, or when the vehicle is lifted up, the load applied to each tire of the vehicle becomes significantly small and the steering wheel 21 is freely rotatable. Therefore, the steering wheel 21 may be easily rotated by only a slight current being supplied to the motor 31. That is, the so-called self-steering may occur. In order to suppress occurrence of the self-steering in such a specific situation, the microcomputer 42 executes the following process.

Figure 10:
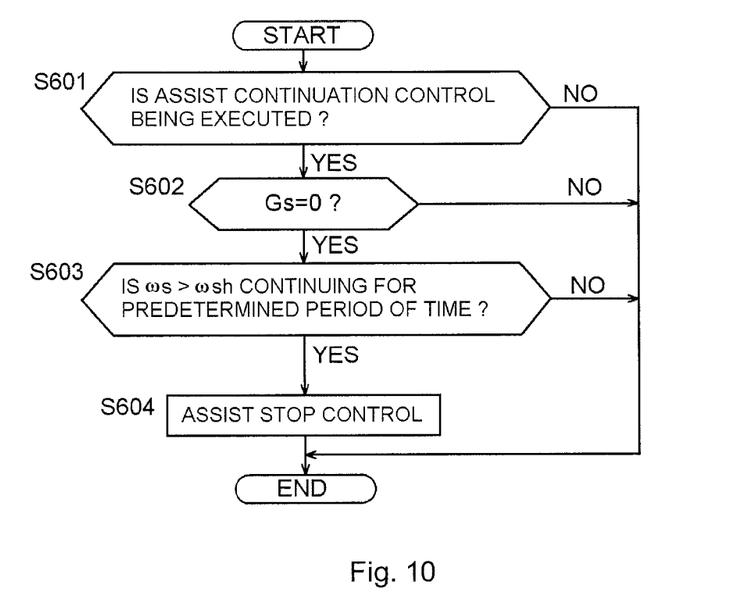
FIG. 10 is a flowchart showing a procedure of assist control according to a second embodiment.

As shown in a flowchart of FIG. 10, the microcomputer 42 determines whether or not the assist continuation control is being executed (Step S601). When it is determined that the assist continuation control is being executed (Step S601, YES), the microcomputer 42 determines whether or not the steering speed gain Gs is set to "0" (Step S602).

When it is determined that the steering speed gain Gs is set to "0" (Step S602, YES), the microcomputer 42 determines whether or not a state where the steering speed ωs is equal to or higher than the steering speed determination threshold ωsh is continuing for a predetermined period of time or longer (Step S603).

When it is determined that the state where the steering speed ωs is equal to or higher than the steering speed determination threshold ωsh is continuing for the predetermined period of time or longer (Step S603, YES), the microcomputer 42 executes the assist stop control (Step S604) and ends the processing. That is, the calculation of the basic assist controlled variable Ias* is stopped, and accordingly, the calculation itself of the current command value I* is stopped. As a result, occurrence of the unintended steering behavior, such as the self-steering due to the above-described deviation of the electrical angle, is suppressed.

When the assist control is not being executed (Step S601, NO), when the steering speed gain Gs is not set to "0" (Step S602, NO), or when the state where steering speed ωs is equal to or higher than the steering speed determination threshold ωsh is not continuing for the predetermined period of time or longer (Step S603, NO), the microcomputer 42 ends the processing.

According to the second embodiment, the following effects can be obtained in addition to the effects of (1) and (2) of the first embodiment. (3) If the steering speed ωs does not decrease and is kept equal to or higher than the steering speed determination threshold ωsh when the steering speed gain Gs is set to "0", the assist stop control is executed. Unlike a case where the current command value I* is set to "0", for example, by setting the steering speed gain Gs to "0", the calculation of the basic assist controlled variable Ias* is stopped and accordingly, the calculation itself of the current command value I* is stopped. Therefore, it is possible to appropriately stop the supply of the electric power to the motor 31. Thus, occurrence of the unintended steering behavior, such as the self-steering due to the deviation of the electrical angle, can be suppressed by stopping the assist control itself.

Next, an electric power steering system according to a third embodiment will be described. The third embodiment basically has the same configuration as that of the first embodiment shown in the above-described FIGS. 1, 2, and 4. In the third embodiment, the assist force applied to the steering system when the above-described assist continuation control is executed is different from the assist force applied to the steering system when the normal control is executed.

Figure 11:
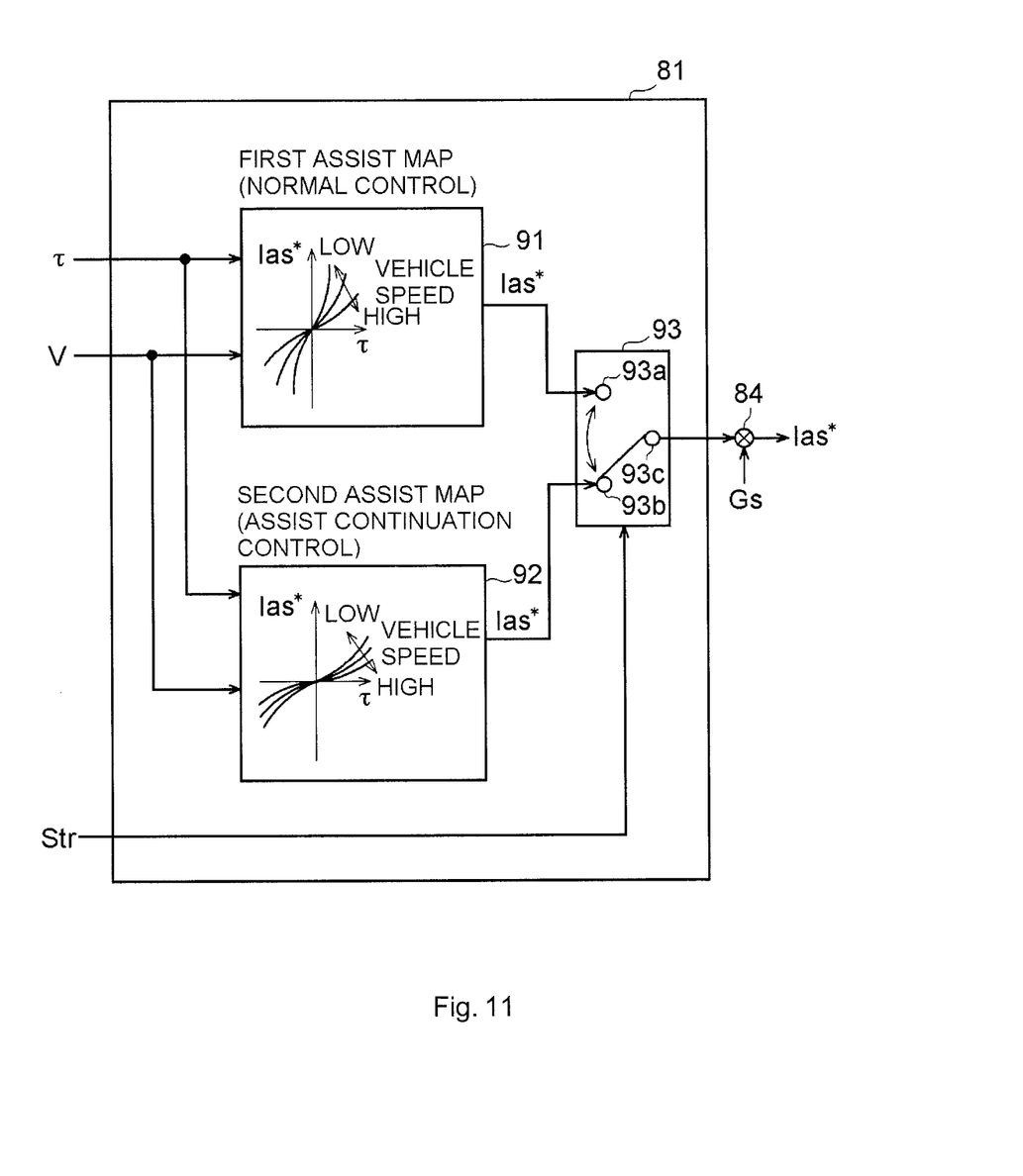
FIG. 11 is a control block diagram showing the configuration of a basic assist controlled variable computing unit according to a third embodiment.

As shown in FIG. 11, the basic assist controlled variable computing unit 81 includes a first assist map 91 for normal control, a second assist map 92 for assist continuation control, and a basic assist controlled variable switching unit 93.

Both of the first and the second assist maps 91 and 92 are vehicle-speed-adaptive three-dimensional maps for calculating the basic assist controlled variable Ias* on the basis of the steering torque τ and the vehicle speed V. In both of the first and the second assist maps 91 and 92, as the steering torque τ (absolute value) is larger and as the vehicle speed V is smaller, the basic assist controlled variable Ias* having a larger value (absolute value) is calculated so that a larger assist force is applied to the steering system. However, in a case where the steering torque τ remains the same and the vehicle speed V remains the same, the basic assist controlled variable Ias* obtained by the first assist map 91 is equal to or more than two times the basic assist controlled variable Ias* obtained by the second assist map 92.

When it is determined on the basis of the abnormality detection signal Str that both of the two normal sensor elements 14a and 14b are normal, the basic assist controlled variable switching unit 93 connects a contact 93c and a contact 93a to each other to supply the basic assist controlled variable Ias* obtained by the first assist map 91 to the multiplier 84.

When it is determined on the basis of the abnormality detection signal Str that only either one of the two sensor elements 14a and 14b fails, the basic assist controlled variable switching unit 93 connects the contact 93c and the contact 93b to each other to supply the basic assist controlled variable Ias* obtained by the second assist map 92 to the multiplier 84.

Thus, according to the third embodiment, the following effects can be obtained. (4) In the case where the configuration, in which the assist force applied to the steering system during the execution of the assist continuation control is made weaker than that when the normal control is executed, is employed as in the third embodiment, the steering torque caused by the driver is apt to become particularly large when the vehicle is in the stopped state or is traveling at an extremely low speed. That is, the unintended steering behavior, such as the above-described self-excited vibration, is apt to occur. The first and the second embodiments are suitable for the electric power steering system 10 as in the third embodiment.

Each of the above-described embodiments may be changed and carried out as follows.

In the second embodiment, in the determination of Step S603 in the flowchart of FIG. 10, the steering speed ωs is compared with the steering speed determination threshold ωsh. However, the steering speed determination threshold ωsh may be made different from the value used in the steering speed gain map 85.

In each of the above-described embodiments, the assist control unit 72 may execute various kinds of compensation control, for example, torque differentiation control. In this case, the assist control unit 72 calculates a compensation component (torque differentiation controlled variable) based on a differential value of the steering torque τ, and adds the compensation component to the basic assist controlled variable Ias*. This enhances a response with which the assist force is applied with respect to a change in the steering torque τ. Note that when the above-described so-called reverse gain failure has occurred, the plus or minus sign of the compensation component in the torque differentiation control is also reversed. This is also a cause of the above-described self-excited vibration.

In the first embodiment, when abnormality is detected in any one of the two sensor signals Sa, Sb, the presence or absence of abnormality of the remaining normal sensor signal is detected by applying the instantaneous motor torque to the steering system. However, the abnormality detection processing for the normal sensor signal may not be executed. Even in this case, the unintended steering behavior, such as the above-described self-excited vibration, may occur after abnormality is detected in any one of the two sensor signals Sa, Sb. In this case, when it is determined through the monitoring of the steering speed ωs that the possibility that the unintended steering behavior occurs is high, the assist force applied to the steering system is reduced by multiplying the basic assist controlled variable Ias* by the steering speed gain Gs according to the steering speed ωs. This improves the steering behavior. In this case, the test torque control unit 73 shown in the above-described FIG. 2 may be omitted.

Although the torque sensor 53 that generates the sensor signals Sa, Sb of two systems is employed in each of the above-described embodiments, a torque sensor that generates sensor signals of three or more systems may be employed. In a case where a sensor signal of one system is a normal sensor signal among sensor signals of a plurality of systems, when the absolute value of the steering speed ωs is equal to or higher than the steering speed determination threshold ωsh, the basic assist controlled variable Ias* is made zero by making the steering speed gain Gs "0". As a result, occurrence of the above-described unintended steering behavior is suppressed.

Although the torque sensor 53 that generates the sensor signals Sa, Sb of two systems is employed in each of the above-described embodiments, a torque sensor that generates a sensor signal of one system may be employed. When the absolute value of the steering speed ωs is equal to or higher than the steering speed determination threshold ωsh, the basic assist controlled variable Ias* is made zero by making the steering speed gain Gs "0". As a result, occurrence of the above-described unintended steering behavior is suppressed.

What is claimed is:

1. An electric power steering system comprising:
a steering effort assist device that includes a motor as a drive source and applies an assist force to a steering system of a vehicle;
a torque sensor that generates a sensor signal according to a steering torque that acts on a steering shaft;
a control device that calculates an assist controlled variable that is a control component according to the assist force to be applied to the steering system, based on the steering torque obtained from the sensor signal and based on a multiplication factor of a steering speed gain calculated on the basis of a vehicle speed and a steering speed, and controls the motor according to the assist controlled variable,
wherein the control device makes the assist controlled variable zero when an absolute value of a steering speed is equal to or higher than a threshold set based on a possibility that an unintended steering behavior occurs, the assist control variable being calculated using a vehicle-speed-adaptive three-dimensional map, the map set so that a value of a steering speed gain is set to 1 until the absolute value of the steering speed reaches a first threshold, and once the absolute value of the steering speed reaches the first threshold, the value of the steering speed gain is set to gradually decrease and is set to zero once the steering speed reaches a second threshold higher than the first threshold, and
wherein the unintended steering behavior is a self-excited vibration caused when reverse gain failure occurs in the torque sensor.

2. The electric power steering system according to claim 1, wherein the control device makes the assist controlled variable zero when the absolute value of the steering speed calculated is equal to or higher than the threshold in a case where the vehicle is in a stopped state or is traveling at an extremely low speed.

3. The electric power steering system according to claim 1, wherein the torque sensor generates sensor signals of a plurality of systems, and
wherein in a case where a sensor signal of one system is a normal sensor signal among the sensor signals of the systems, the control device calculates the assist controlled variable using the normal sensor signal so that the assist force continues to be applied to the steering system, and calculates the assist controlled variable so that the assist force is smaller than that before a situation occurs in which the sensor signal of the one system is the normal sensor signal among the sensor signals of the systems.

4. The electric power steering system according to claim 3, wherein in the case where the sensor signal of the one system is the normal sensor signal among the sensor signals of the systems, the control device calculates the assist controlled variable so that an instantaneous motor torque is applied to the steering system, makes a determination as to whether abnormality has occurred in the normal sensor signal based on whether application of the instantaneous motor torque is reflected in the normal sensor signal, and stops generation of the assist controlled variable when a result of the determination indicates that the abnormality has occurred in the normal sensor signal, and
wherein in a case where the vehicle is in a stopped state or is traveling at an extremely low speed, the control device stops the determination as to whether the abnormality has occurred in the normal sensor signal.

5. The electric power steering system according to claim 1, further comprising:

a rotation angle sensor that detects a rotation angle of the motor, wherein the control device controls the motor through electric current feedback control based on the rotation angle, and stops generation of the assist controlled variable if a state where the absolute value of the steering speed is equal to or higher than the threshold or another threshold set to a value different from the threshold continues for a predetermined period of time when the assist controlled variable is made zero.

6. An electric power steering system comprising:

a steering effort assist device that includes a motor as a drive source and applies an assist force to a steering system of a vehicle;

a torque sensor that generates a sensor signal according to a steering torque that acts on a steering shaft;

a control device that calculates an assist controlled variable that is a control component according to the assist force to be applied to the steering system, based on the steering torque obtained from the sensor signal and based on a multiplication factor of a steering speed gain calculated on the basis of a vehicle speed and a steering speed, and controls the motor according to the assist controlled variable, wherein the control device makes the assist controlled variable zero when an absolute value of a steering speed is equal to or higher than a threshold set based on a possibility that an unintended steering behavior occurs, the assist control variable being calculated using a vehicle-speed-adaptive three-dimensional map, the map set so that a value of a steering speed gain is set to 1 until the absolute value of the steering speed reaches a first threshold, and once the absolute value of the steering speed reaches the first threshold, the value of the steering speed gain is set to gradually decrease and is set to zero once the steering speed reaches a second threshold higher than the first threshold, and wherein the unintended steering behavior is self-steering due to deviation of an electrical angle.

7. The electric power steering system according to claim 6, wherein the torque sensor generates sensor signals of a plurality of systems, and wherein in a case where a sensor signal of one system is a normal sensor signal among the sensor signals of the systems, the control device calculates the assist controlled variable using the normal sensor signal so that the assist force continues to be applied to the steering system, and calculates the assist controlled variable so that the assist force is smaller than that before a situation occurs in which the sensor signal of the one system is the normal sensor signal among the sensor signals of the systems.

8. The electric power steering system according to claim 7, wherein in the case where the sensor signal of the one system is the normal sensor signal among the sensor signals of the systems, the control device calculates the assist controlled variable so that an instantaneous motor torque is applied to the steering system, makes a determination as to whether abnormality has occurred in the normal sensor signal based on whether application of the instantaneous motor torque is reflected in the normal sensor signal, and stops generation of the assist controlled variable when a result of the determination indicates that the abnormality has occurred in the normal sensor signal, and wherein in a case where the vehicle is in a stopped state or is traveling at an extremely low speed, the control device stops the determination as to whether the abnormality has occurred in the normal sensor signal.

\* \* \* \* \*